United States Patent [19]
Earle et al.

[11] Patent Number: 5,740,983
[45] Date of Patent: Apr. 21, 1998

[54] TAPELESS SPLICING SYSTEM FOR PHOTOGRAPHIC FILMSTRIPS

[75] Inventors: Anthony Earle, Harrow; Edward Charles Timothy Samuel Glover, London, both of England

[73] Assignee: Eastman Kodak Company, Rochester, N.Y.

[21] Appl. No.: 680,742

[22] Filed: Jul. 15, 1996

[30] Foreign Application Priority Data

Jul. 29, 1995 [GB] United Kingdom ............ 9515631

[51] Int. Cl.⁶ .................................................. B65H 19/18
[52] U.S. Cl. ................................ 242/556; 242/348.3
[58] Field of Search ...................... 242/332.4, 348.3, 242/551, 553, 556

[56] References Cited

U.S. PATENT DOCUMENTS

| | | | |
|---|---|---|---|
| 1,655,297 | 1/1928 | Thornton | 242/332.4 |
| 1,850,071 | 3/1932 | Boyer | 242/556 |
| 3,741,079 | 6/1973 | Bossons et al. | 242/556 |
| 3,962,762 | 6/1976 | Alexeff | 242/556 |
| 4,572,460 | 2/1986 | Hertrich | 242/332.4 |
| 4,720,913 | 1/1988 | Hertrich | 242/332.4 |
| 5,229,804 | 7/1993 | Pagano | 242/348.3 |
| 5,332,173 | 7/1994 | Kubota et al. | 242/348.3 |

FOREIGN PATENT DOCUMENTS

| | | |
|---|---|---|
| 1 597 748 | 9/1981 | United Kingdom . |
| 86/07295 | 12/1986 | WIPO . |

*Primary Examiner*—John P. Darling
*Attorney, Agent, or Firm*—Frank Pincelli; David A. Novais

[57] ABSTRACT

A tapeless splicing system which allows the joining and separation of filmstrips without the use of tape. The system comprises forming an aperture (16, 26) in a leading end (12, 22) of a filmstrip (14, 20) and a tongue portion (28, 29, 30, 32, 34, 36) in a trailing end (24) thereof. The tongue portion (28, 29, 30, 32, 34, 36) of one filmstrip (20) is inserted through the aperture (16) of another filmstrip (12) by distortion as it is pushed through the aperture (16), the tongue portion (28, 29, 30, 32, 34, 36) and the aperture (16) being sized and shaped to provide effective interlocking between the two filmstrips (14, 20).

16 Claims, 2 Drawing Sheets

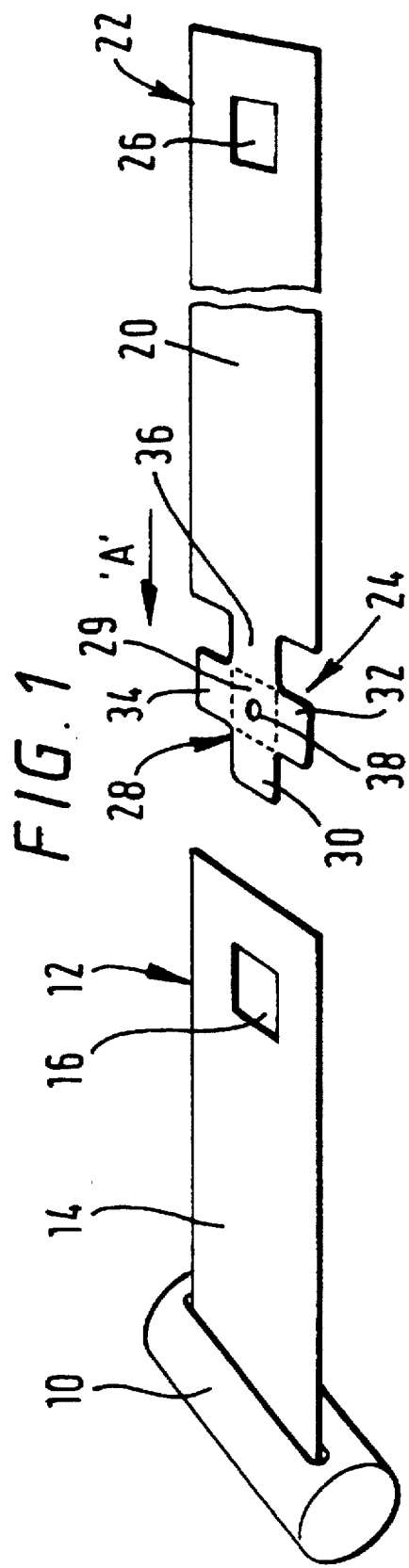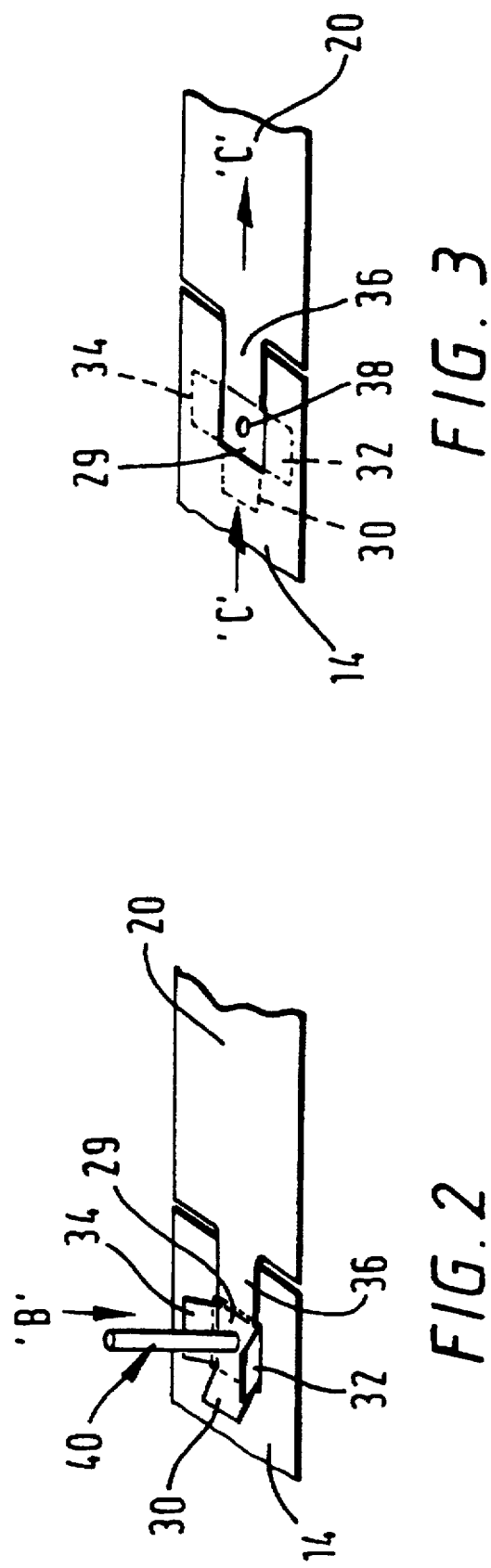

TAPELESS SPLICING SYSTEM FOR PHOTOGRAPHIC FILMSTRIPS

FIELD OF THE INVENTION

The present invention relates to a tapeless splicing system for photographic filmstrips.

BACKGROUND OF THE INVENTION

It is well known to splice exposed filmstrips together to form a roll for processing, that is, for developing and printing. Traditionally, a leading end of one filmstrip is attached to a trailing end of another filmstrip using splicing tape, the addition of the splicing tape increasing the overall thickness of the roll at each splice. Once processing has been completed, the splicing tape is removed so that the roll can be separated into its component filmstrips for returning to customers.

In other splicing systems, the filmstrips are attached to one another using metal staples.

PROBLEM TO BE SOLVED BY THE INVENTION

In many cases, after the filmstrip has been processed in a roll, the removal of the tape may not be complete as some residual adhesive may remain on the separated filmstrips.

Moreover, the use of staples may damage the filmstrips when they are formed into a roll for processing.

SUMMARY OF THE INVENTION

It is therefore an object of the present invention to provide a splicing system which does not require the use of splicing tape or staples.

In accordance with one aspect of the present invention, there is provided a method of joining together at least two filmstrips to form a continuous length of filmstrip material, each filmstrip having a first end and a second end, the method being characterized by the steps of:

a) forming an aperture in the first end of each filmstrip;

b) forming a tongue portion in the second end of each filmstrip; and c) inserting the tongue portion of one filmstrip into the aperture of another filmstrip to effect the join.

Advantageously, the tongue portion of each filmstrip is larger than the aperture therein, the joint between two filmstrips being achieved by distorting the tongue portion as it is pushed through into the aperture. Similarly, the filmstrips are separated by distorting the tongue portion as it is pushed out of the aperture.

Preferably, steps a) and b) are carried out during manufacture of the filmstrips.

Naturally, the first and second ends may be respective ones of either a trailing end or a leading end.

In accordance with another aspect of the present invention, there is provided a photographic filmstrip having a first end and a second end, characterized in that an aperture is formed in the first end of the filmstrip and a tongue portion is formed in the second end of the filmstrip, two filmstrips being connected together by inserting the tongue portion of one filmstrip into the aperture formed in another filmstrip.

ADVANTAGEOUS EFFECT OF THE INVENTION

By this arrangement, the filmstrips can be easily joined and separated without the need for extra fixing materials such as splicing tape or staples. Additionally, there is no residual adhesive remaining on the filmstrips once they have been separated. Moreover, the joining and separating operations may be repeated many times without the adhesion of pieces of waste tape which may add to the overall thickness of the filmstrips in the region of the splice.

BRIEF DESCRIPTION OF THE DRAWINGS

For a better understanding of the present invention, reference will now be made, by way of example only, to the accompanying drawings in which:

FIG. 1 is a schematic view showing the leading end of one filmstrip and the trailing end of another filmstrip in accordance with the present invention;

FIG. 2 is a schematic illustration of how two filmstrips are joined;

FIG. 3 is a schematic illustration of two joined filmstrips;

DETAILED DESCRIPTION OF THE INVENTION

Figure 4:
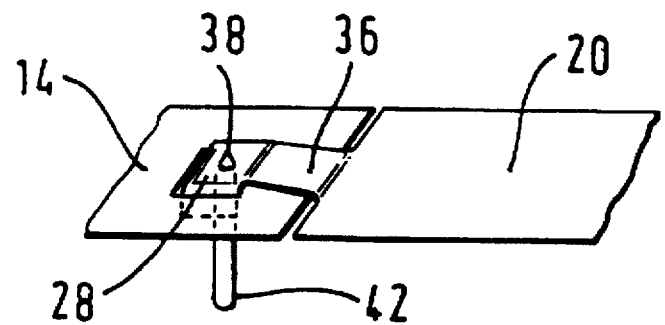
FIG. 4 is a schematic illustration of how two joined filmstrips are separated.

In FIG. 1, a film cassette 10 is shown from which extends a leading end 12 of a filmstrip 14. Leading end 12 has a square aperture 16 formed therein. A further filmstrip 20 is also shown which has been removed from its cassette (not shown). Filmstrip 20 has a leading end 22 and a trailing end 24. A square aperture 26 is formed in the leading end 22 which is identical to aperture 16 formed in filmstrip 14. A tongue portion 28 is formed in the trailing end 24 which is generally 'cross-shaped' and has a central portion 29, indicated by dotted lines, with four orthogonally spaced arm portions 30, 32, 34, 36 extending therefrom as shown. Central portion 29 of tongue portion 28 is substantially the same size as respective apertures 16, 26 formed in the leading ends 12, 22 of filmstrips 14, 20. A small hole 38 is formed in the center of the central portion 29 of tongue portion 28.

In order to join filmstrips 14, 20 together, aperture 16 in filmstrip 14 is positioned over an aperture in a support plate (both not shown). The support plate supports both filmstrips 14, 20 during the joining operation. Tongue portion 28 formed in trailing end 24 of filmstrip 20 is then aligned with aperture 16 formed in the leading end 12 of filmstrip 14 by moving it in the direction of arrow 'A'. A plunger 40 is used to distort the tongue portion 28, particularly arm portions 30, 32, 34, and to push a substantial part thereof through the aperture 16 and through the aperture in the support plate (not shown), the plunger 40 engaging hole 38 located in central portion 29 and acting in the direction indicated by arrow 'B' as shown in FIG. 2.

When the plunger 40 is removed, as shown in FIG. 3, the three arm portions 30, 32, 34 of the 'cross shape' of tongue portion 28, due to the resilience of the filmstrip, lie adjacent filmstrip 14 on the other side of the aperture 16 to arm portion 36 with central portion 29 aligned with aperture 16. The 'cross shape' of tongue portion 28 ensures that it cannot be pulled out of the square aperture 16.

When two filmstrips are joined as shown in FIG. 3, they can be drawn through a processor in the direction indicated by arrows 'C' for developing and printing.

Figure 5:
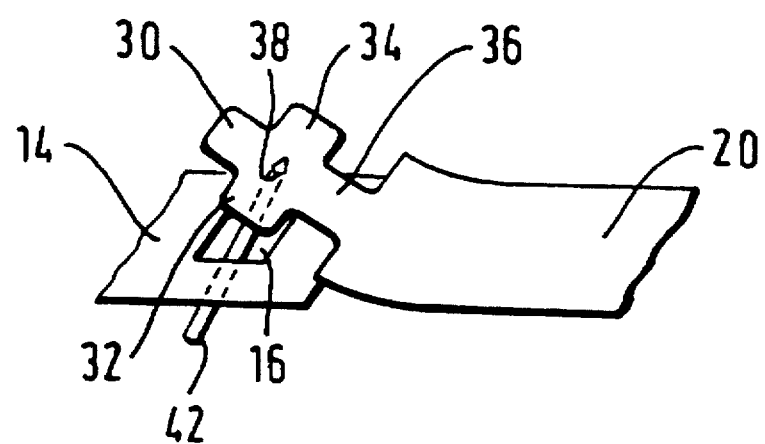
FIG. 5 is a schematic illustration of the two filmstrips of FIG. 4 as they are separated.
Figure 6:
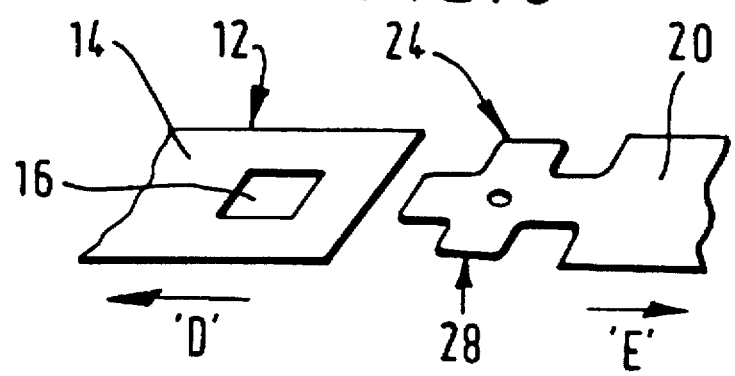
FIG. 6 is a schematic illustration showing the separated filmstrips.

When two joined filmstrips are to be separated, a second plunger 42 engages hole 38 from the other side of the filmstrips 14, 20, as shown in FIG. 4, and distorts tongue portion 28 once more by pushing it upwards through aperture 16, that is, in the opposite direction to arrow 'A' (FIG. 2), until arm portions 30, 32, 34 are free of aperture 16 as shown in FIG. 5. Filmstrip 14 and filmstrip 20 can then be separated by moving filmstrip 14 in the direction indicated by arrow 'D' and filmstrip 20 in the direction indicated by arrow 'E' as shown in FIG. 6.

Although the tongue portion 28 is described as being 'cross shaped', any other suitable shape can be used. Naturally, the shape of the tongue portion 28 is chosen so that appropriate engagement with aperture 16 is achieved. As a result, apertures 16, 26 need not be square, but may be of any suitable shape which permits the desired engagement.

Although the invention has been described as having an aperture formed in the leading end of the filmstrip and the tongue portion in the trailing end thereof, it will be readily appreciated that the aperture could be formed in the trailing end of the filmstrip with the tongue portion in the leading end thereof without affecting the operation of the invention.

The aperture 16, 26 formed in the leading end 12, 22 and the tongue portion 28 of filmstrips 12, 20 may be formed during manufacture. Alternatively, they may be punched into the filmstrips at the processing laboratory.

We claim:

1. A method of joining together at least two filmstrips to form a continuous length of filmstrip material, each filmstrip having a first end and a second end, the method comprising the steps of:

a) forming an aperture in the first end of each filmstrip;

b) forming a tongue portion in the second end of each filmstrip; and c) inserting the tongue portion of one filmstrip into the aperture of another filmstrip to effect the join;

d) wherein the tongue portion of each filmstrip is larger than the aperture therein, the joint between two filmstrips being achieved by distorting the tongue portion of one filmstrip as it is pushed through the aperture of another filmstrip.

2. A method according to claim 1, wherein two filmstrips are separated by distorting the tongue portion of one filmstrip as it is pushed out of the aperture of another filmstrip.

3. A method according to claim 1, wherein said step of forming the aperture in the first end of each filmstrip and said step of forming the tongue portion in the second end of each filmstrip are carried out during manufacture of each filmstrip.

4. A method according to claim 1, wherein, for each filmstrip, the first end is a leading end and the second end is a trailing end.

5. A method according to claim 1, wherein, for each filmstrip, the first end is a trailing end and the second end is a leading end.

6. A method according to claim 1, wherein each aperture is a square aperture.

7. A method according to claim 1, wherein each tongue portion is generally cross-shaped and comprises a central portion and arm portions, at least three of the arm portions engaging the aperture when one filmstrip is connected to another.

8. A photographic filmstrip having a first end and a second end, wherein an aperture is formed in the first end of the filmstrip and a tongue portion is formed in the second end of the filmstrip, two filmstrips being connected together by inserting the tongue portion of one filmstrip into the aperture formed in another filmstrip, and wherein each tongue portion is generally cross-shaped and comprises a central portion and arm portions, at least three of the arm portions engaging the aperture when one filmstrip is connected to another.

9. A filmstrip according to claim 8, wherein, for each filmstrip, the first end is a leading end and the second end is a trailing end.

10. A filmstrip according to claim 8, wherein, for each filmstrip, the first end is a trailing end and the second end is a leading end.

11. A filmstrip according to claim 8, wherein each aperture is a square aperture.

12. A system for splicing a plurality of photographic filmstrips, each filmstrip being in accordance with claim 8.

13. A photographic filmstrip having a first end and a second end, wherein an aperture is formed in the first end and a tongue portion is formed in the second end, the tongue portion being larger than the aperture, whereby said filmstrip is arranged to be joined to a further filmstrip, which is substantially the same as said filmstrip, by distortion of the tongue portion of the said filmstrip as it is pushed through the aperture of said further filmstrip.

14. A filmstrip according to claim 13, wherein, for each of the filmstrip and the further filmstrip, the first end is a leading end and the second end is a trailing end.

15. A filmstrip according to claim 13, wherein, for each of the filmstrip and the further filmstrip, the first end is a trailing end and the second end is a leading end.

16. A filmstrip according to claim 13, wherein each aperture is a square aperture.

* * * * *